United States Patent [19]

Engstrom

[11] Patent Number: 4,676,177
[45] Date of Patent: Jun. 30, 1987

[54] METHOD OF GENERATING ENERGY FROM LOW-GRADE ALKALINE FUELS

[75] Inventor: Folke Engstrom, Karhula, Finland

[73] Assignee: A. Ahlstrom Corporation, Karhula, Finland

[21] Appl. No.: 785,620

[22] Filed: Oct. 9, 1985

[51] Int. Cl.$^4$ ............................ F23T 15/00; F23G 5/46
[52] U.S. Cl. ................................. 110/345; 110/229; 110/210; 110/234; 110/245; 48/197 R; 48/197 A; 48/209
[58] Field of Search ............... 48/197 R, 197 A, 209, 48/210; 110/216, 210, 234, 245, 345, 346, 229

[56] References Cited

U.S. PATENT DOCUMENTS

| 3,639,111 | 2/1972 | Brink et al. ............. | 48/209 |
| 3,670,669 | 6/1972 | Hoad ....................... | 110/234 |
| 3,884,162 | 5/1975 | Schuster ................. | 110/234 |
| 3,989,480 | 11/1976 | Appell et al. .......... | 48/209 |
| 4,253,409 | 3/1981 | Wormser ................. | 110/344 |
| 4,300,915 | 11/1981 | Schmidt et al. ........ | 48/197 A |
| 4,372,755 | 2/1983 | Tolman et al. ......... | 48/209 |
| 4,398,475 | 8/1983 | McKiel, Jr. ............ | 110/210 |
| 4,437,416 | 3/1984 | Ishii et al. ............... | 110/347 |
| 4,448,589 | 5/1984 | Fan et al. ................ | 48/209 |
| 4,474,121 | 10/1984 | Lewis ..................... | 110/210 |
| 4,568,362 | 2/1986 | Declise et al. .......... | 48/209 |

FOREIGN PATENT DOCUMENTS

| 2732647 | 1/1928 | Fed. Rep. of Germany ...... | 110/210 |
| 2303457 | 8/1974 | Fed. Rep. of Germany ...... | 110/235 |
| 2426079 | 1/1980 | France ......................... | 48/209 |
| 149272 | 11/1979 | Japan ........................... | 110/216 |
| 92612 | 6/1982 | Japan ........................... | 110/210 |
| 156109 | 9/1983 | Japan ........................... | 110/216 |
| 8101713 | 6/1981 | World Int. Prop. O. . | |
| 2134921 | 8/1984 | United Kingdom ............. | 48/209 |

Primary Examiner—David L. Lacey
Attorney, Agent, or Firm—Nixon & Vanderhye

[57] ABSTRACT

Heat energy is generated from low-grade alkaline fuels (such as manure and lignite) in a gasifier-combustor system. The fuel is gasified at a temperature of less than 900° C. in a circulating fluidized bed gasifier comprising a first cyclone separator. The gas leaving the first separator is conveyed to a second cyclone separator. The gas leaving the second separator is burned in a boiler at a temperature of at least 900° C. Alkaline containing material is removed and collected from the gasifier, the first and second separators, the boiler and a filter before the gas is vented to the atmosphere.

19 Claims, 1 Drawing Figure

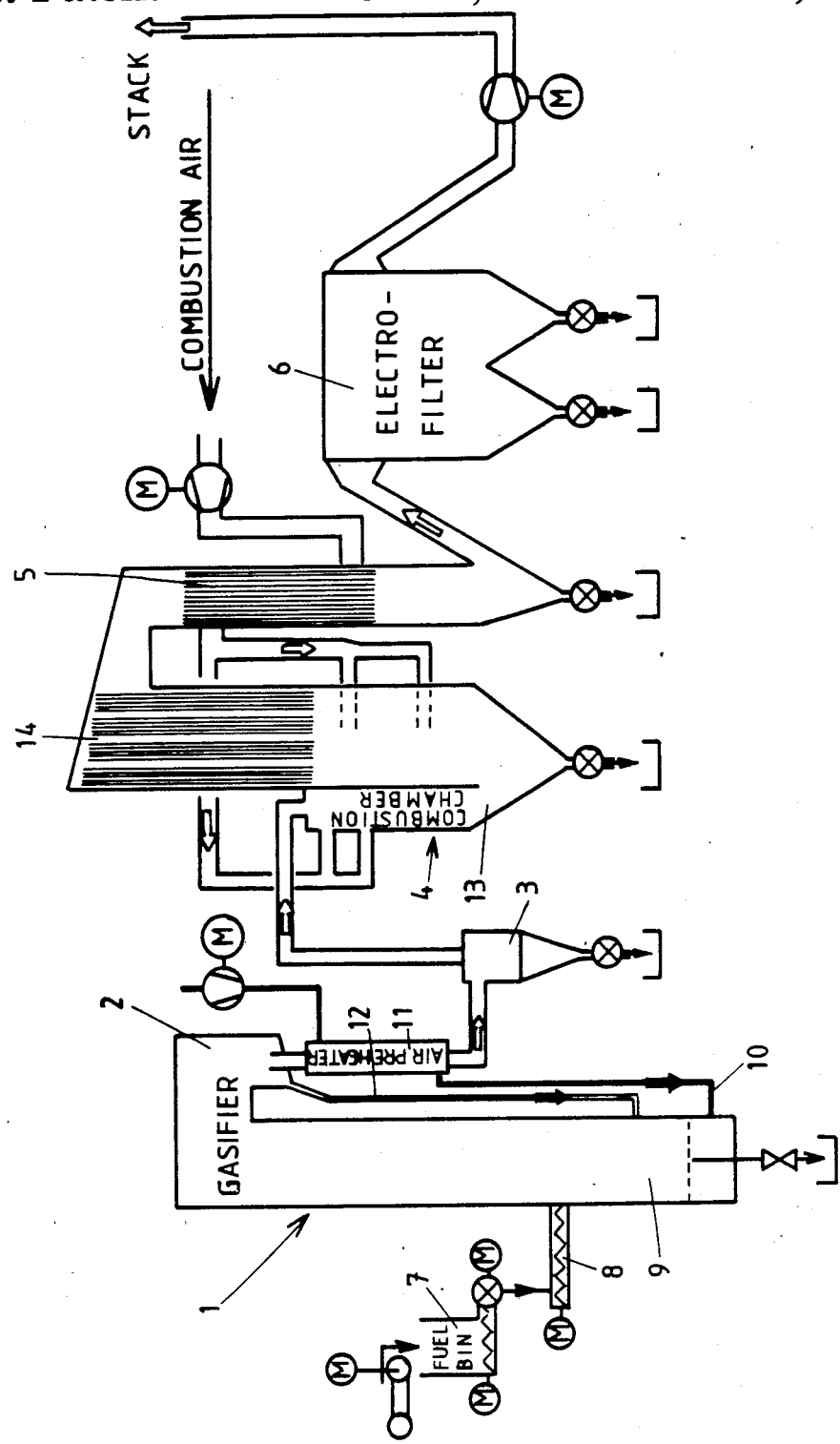

4,676,177

METHOD OF GENERATING ENERGY FROM LOW-GRADE ALKALINE FUELS

BACKGROUND OF THE INVENTION

Livestock and poultry in confined feeding operations produce 52 million tons of manure each year; these animal wastes pose pollution, odor and health problems. An efficient way of disposing the waste is to combust it directly and to supply the energy requirements of feed processing and power production. Manure ash has, however, shown to result in sintering and slagging of the combustor, fouling of the heat transfer surfaces and corrosion of the construction material. The sintering and fouling problems are caused mainly by relatively high mineral content of alkaline compounds (Na, K) which together with chloride (Cl) results also in high and low temperature corrosion.

The direct combustion of low-grade fuels, such as lignite or brown coal, is becoming more important for both utility and industrial use. Some of the major difficulties in burning low-grade fuels are: the fouling/slagging of the heat transfer surface and the sensitivity of the combustors to fuel variability (moisture, alkaline contents, etc.).

OBJECT OF THE INVENTION

An object of the invention is to provide a gasification/combustion process in which the sintering, slagging and corrosion problems caused by alkaline and other low melting constituents substantially can be avoided.

DESCRIPTION OF THE INVENTION

The present invention provides a heat recovery system of primary usefulness in generating and recovering heat energy from low-grade alkaline fuel, such as manure, lignite, and the like. The system comprises a circulating bed gasifier operating in a temperature range of about 500° to 850° C., preferably about 750° C., a cyclone separator and a slagging boiler operating at a temperature of at least 900° C., preferably about 1200° C.

ADVANTAGES

The major advantages of the process are:
sintering of the fluidized bed and the recirculation system can be avoided due to the low temperature gasification compared to the temperature required for complete combustion;
at low temperatures, considerably smaller amounts of alkaline compounds are volatilized thus reducing the fouling and the slagging of the heat transfer surfaces and the plugging of the dust separators as well as the corrosion;
the heat value of the low-grade fuels varies considerably mainly due to variation in the moisture content. The gasifying process is much easier to control than the combustion process, simply by adding or reducing the oxidative medium.

BRIEF DESCRIPTION OF THE DRAWING

The drawing FIGURE schematically illustrates an exemplary gasifier-combustion system for practicing the method of the present invention.

DETAILED DESCRIPTION OF THE PREFERRED EMBODIMENT

A typical installation for carrying out the process according to the invention is shown in the drawing. The installation comprises the following main parts: a circulating fluidized bed gasifier 1, a first cyclone-type separator 2, a second cyclone-type separator 3, a boiler 4, an air preheater 5 and an electro-filter 6.

Combustible material containing alkaline compounds is supplied to a fuel bin 7 and is fed by a screw feeder 8 into the gasifier chamber 9 of the fluidized bed gasifier. An oxygen containing gas such as air is introduced into the bottom region of the reactor through a pipe 10 below a perforated distributor plate to bring about a substoichiometric reaction (i.e. at substoichiometric conditions) with the fuel at the temperature of less than 900° C., and preferably in the range of about 500° to 850° C. The air is indirectly preheated (optional) by product gas from the reactor in a preheater 11.

Superficial gas velocities in the fluidized bed in the range of 1 to 10 m/sec are preferred whereby solid particles are entrained by the gas. Alkaline gas containing ash leaves the upper part of the gasifier and is conveyed to the first cyclone separator 2 in which solid particles are separated from the gas. The separated particles are recycled to the gasifier by means of a return duct 12. The gas removed from the cyclone is conveyed through the air preheater 11 to the second cyclone separator 3 in which additional solids are removed from the gas, and collected.

The product gas leaving the cyclone separator contains combustible matter, char and volatilizing inorganic compounds. This product gas is burned in a combustion chamber 13 of the boiler 4 at oxidizing conditions at a temperature at least 900° C., and preferably in the range of about 1000° to 1600° C. (most preferably at 1200° C.). Melt and solid ash, which contain alkaline compounds, are drained through the bottom of the boiler and collected. The flue gases pass through a convection section 14 of the boiler, in which heat energy is recovered in the form of steam. Additional heat recovery is provided by passing the gases to air preheater 5, in which the combustion air supplied to the boiler is preheated. The flue gases are dedusted in a precipitator 6 which preferably is electrostatic, such as an electro-filter, before they are vented to the atmosphere.

EXAMPLES

Example 1; Prior Art

Direct combustion of cattle manure in a CFBC (Circulating Fluidized Bed Combustor) combustor at approximately 880° C. resulted in severe fouling of connective heat transfer tubing and in plugging of bag filters. The major reason for the operative problems was the intense volatilization of alkaline compounds which later condensed upon surfaces and also formed submicronic particles plugging the bag filters. Under steady state conditions roughly 60 to 80 percent of the alkaline compounds, mainly as chlorides, were elutriated with the flue gases and caused the problems described above.

Example 2; The Invention

When the same cattle manure as in Example 1 was gasified at 750° C., only a small portion of the alkaline compounds were volatilized. Ash containing alkaline compounds could be drained from the bottom of the fluidized bed gasifier 1 and separated from the gas without any problems because the gasifying temperature was below the sintering temperature of the alkaline compounds and their eutectics. The second cyclone separator 3 was found to be important to a satisfactory practice of the invention. The flue gases were later combusted in a slagging boiler 4 from which a part of the alkaline compounds were removed as melted ash from the bottom of the furnace and the rest as dry solids from the dust separator 6.

It will thus be seen that according to the present invention a simple yet effective method of generating energy from low-grade alkaline fuels has been provided. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and procedures.

What is claimed is:

1. A method of generating energy from low-grade alkaline fuels, comprising the steps of:
   gasifying low-grade alkaline fuel in a circulating fluidized bed gasifier at a temperature of less than 900° C. to form an alkaline gas with solid particles containing alkaline compounds entrained therein and ash containing alkaline compounds;
   removing the ash containing alkaline compounds from the bottom of the gasifier;
   conveying the alkaline gas gas from the gasifier to a first separator and separating the solid particles therefrom;
   recycling the solid particles removed by the first separator to the gasifier;
   conveying the gas from the first separator to a second separator and separating any remaining of said solid particles from the conveying gas;
   conveying the gas from the second separator to a boiler and burning the gas in the boiler at a temperature of at least 900° C. to form a melt containing said solid particles; and
   draining said melt containing said solid particles containing alkaline compounds from the boiler.

2. The method of claim 1 in which the fuel is gasified at a temperature in the range of about 500° to 850° C.

3. The method of claim 1 in which the gas conveyed to the boiler is burned at a temperature in the range of about 1000° to 1600° C.

4. The method of claim 1 comprising the further step of cooling the gas when it leaves the first separator before it is conveyed to the second separator.

5. A method as recited in claim 1 wherein the low-grade alkaline fuel is manure.

6. A method as recited in claim 1 wherein the low-grade alkaline fuel is lignite.

7. A method as recited in claim 1 comprising the further step of recovering heat from flue gases obtained by burning the gas in the boiler.

8. A method as recited in claim 7 wherein said step of recovering heat from the flue gases is accomplished by passing combustion air for the boiler into heat-exchange relationship with the flue gases so that the combustion air is heated, and then subsequently feeding the combustion air to the boiler.

9. A method as recited in claim 8 wherein said step of recovering heat from the flue gases is further practiced by recovering heat energy in the form of steam in a convection section of the boiler.

10. A method as recited in claim 9 comprising the further step of removing particulates from the boiler flue gases after recovery of the heat value thereof.

11. A method of generating energy from low-grade alkaline fuels, such as manure and lignite, utilizing a circulating fluidized bed reactor, comprising the steps of:
   (a) gasifying low-grade alkaline fuel in a circulating fluidized bed gasifier at a temperature below the sintering temperature of alkaline compounds, and their eutectics, in the low-grade alkaline fuel, so as to produce a fuel gas containing solid particles, containing alkaline compounds and an ash containing alkaline compounds;
   (b) removing the ash containing alkaline compounds from the bottom of the gasifier;
   (c) separating said solid particles containing alkaline compounds from the fuel gas; and
   (d) after step (c), combusting the fuel gas to produce heat energy and a melted ash containing alkaline compounds, and flue gases containing particulates having alkaline compounds.

12. A method as recited in claim 11 wherein step (d) is practiced by feeding preheated combustion air, and the fuel gas, to a boiler; and comprising the further step of draining said melted ash containing alkaline compounds from the boiler.

13. A method as recited in claim 12 comprising the further step of separating said particles containing alkaline compounds from the flue gases produced during the practice of step (d).

14. A method as recited in claim 12 wherein the combustion air utilized in the practice of step (d) is preheated by passing it into heat exchange relationship with the flue gases produced during the combustion step (d).

15. A method as recited in claim 12 wherein step (d) is practiced by effecting combustion of the fuel gas at a temperature in the range of about 1000°-1600° C.

16. A method as recited in claim 11 wherein step (a) is practiced at substoichiometric conditions.

17. A method as recited in claim 16 wherein step (a) is practiced at a temperature in the range of about 500°-850° C.

18. A method as recited in claim 17 wherein step (d) is practiced at a temperature of about 1000°-1600° C.

19. A method as recited in claim 11 wherein step (c) is practiced by: (i) effecting a first separation of the fuel gas from said solid particles therein; (ii) recycling the solid particles separated in the first separation to the fluidized bed gasifier; and (iii) effecting a second separation of said particles containing alkaline compounds from the gas.

* * * * *